UNITED STATES PATENT OFFICE.

OTTO MÜLLER, OF LEIPZIG-NEUSCHÖNEFELD, GERMANY, ASSIGNOR TO GUSTAV HESS, OF PIRNA-ON-THE-ELBE, GERMANY.

MAKING ALBUMINOUS BREAD.

No. 911,745.

Specification of Letters Patent.

Patented Feb. 9, 1909.

Application filed November 23, 1903. Serial No. 182,324.

*To all whom it may concern:*

Be it known that I, OTTO MÜLLER, a subject of the King of Saxony, and resident of No. 7 Jonasstrasse, Leipzig-Neuschönefeld, Saxony, Germany, have invented a new and Improved Process for Making Albuminous Bread, of which the following is a description.

The present invention relates to a process for manufacturing a highly albuminous food product from fish, potatoes, flour, leavening and liquids.

The fish, for instance cod-fish, haddock and the like, are carefully freed of bones and other refuse parts and are worked together with boiled potatoes. A dough is then prepared by adding flour, as rye, wheat and the like, and the necessary admixtures used in the ordinary bread-baking process, such as leaven, yeast or the like ferments, water, milk, spice and the like, according to whether black bread, white bread, zwieback, pie etc. is to be produced. The dough obtained in this manner is allowed to rise and is then baked in the ordinary manner in the baking oven.

By the action of the various ingredients upon each other, especially of the potato, a new product is formed during the fermenting and baking processes. The fishy taste and odor has completely disappeared, and there is obtained a product which in regard to appearance and taste so perfectly resembles the ordinary bread etc. products, that it cannot be distinguished therefrom. It therefore offers an improved substitute for bread products, and constitutes an excellent, cheap nourishing food for the people.

It is obvious that the final product may be marketed in any desirable form or shape. It may also be pulverized, and can then be conveniently added to soups. By working up the fish in whole and not previously peeling the potatoes, an excellent food for animals of all description is obtained. It is advisable to first dry, and grate or crush the fish and the potato in this case. The proportions of the various ingredients should be about:— $2\frac{1}{2}$ parts of fish, $4\frac{1}{2}$ parts of potato, 3 parts of flour, and the necessary quantity of ferment, liquid and taste improving admixtures. The food product thus obtained contains some 18–20 % of protein matter, and is therefore about three times as rich in nitrogen as for instance the ordinary rye or wheat bread, which contains only from 6–7 % of protein.

What I claim is:—

1. The herein described process of making albuminous bread which consists in mixing together and kneading boiled potatoes and cooked fish; then adding to such mixture rye or wheat flour; a liquid and a ferment, all substantially in the proportions specified, thus forming a dough; then properly working the dough; then permitting the dough to rise; and finally baking the dough in an oven, substantially as described.

2. The herein described process of making albuminous bread which consists in grating boiled fish with boiled and peeled potatoes; kneading the product with rye or wheat flour and the usual ingredients used in the baking of bread, all in substantially the proportions specified, to a dough; then permitting the dough to rise; and thereupon baking the dough in the ordinary way, substantially as described.

In witness whereof I have hereunto set my hand in presence of two witnesses.

OTTO MÜLLER.

Witnesses:
 MORITZ SPREER,
 RUDOLPH FRICKE.